US011613446B2

(12) United States Patent
De Rai et al.

(10) Patent No.: US 11,613,446 B2
(45) Date of Patent: Mar. 28, 2023

(54) ELEVATOR SYSTEM

(71) Applicant: Prysmian S.p.A., Milan (IT)

(72) Inventors: Luca Giorgio Maria De Rai, Milan (IT); Michelangelo Graziano, Milan (IT); Donald Ray Parris, Milan (IT)

(73) Assignee: Prysmian S.p.A., Milan (IT)

(*) Notice: Subject to any disclaimer, the term of this patent is extended or adjusted under 35 U.S.C. 154(b) by 713 days.

(21) Appl. No.: 16/664,307

(22) Filed: Oct. 25, 2019

(65) Prior Publication Data

US 2020/0131002 A1 Apr. 30, 2020

(30) Foreign Application Priority Data

Oct. 26, 2018 (IT) .................. 102018000009826

(51) Int. Cl.
| B66B 7/06 | (2006.01) |
| B66B 9/00 | (2006.01) |
| H02J 7/00 | (2006.01) |
| H02J 7/02 | (2016.01) |

(52) U.S. Cl.
CPC ............... B66B 7/064 (2013.01); B66B 9/00 (2013.01); *H02J 7/0042* (2013.01); *H02J 7/025* (2013.01)

(58) Field of Classification Search
CPC . B66B 11/0407; B66B 11/007; B66B 11/003; B66B 7/064
See application file for complete search history.

(56) References Cited

U.S. PATENT DOCUMENTS

| 4,402,386 A | 9/1983 | Ficheux et al. |
| 5,074,384 A | 12/1991 | Nakai et al. |
| 2011/0061976 A1* | 3/2011 | Tiner .................. B66B 11/0461 187/404 |
| 2015/0307321 A1* | 10/2015 | Breite ....................... B66B 7/06 187/254 |
| 2017/0057780 A1 | 3/2017 | Nguyen et al. |
| 2018/0282125 A1* | 10/2018 | Zhao ......................... D07B 1/16 |
| 2019/0002241 A1* | 1/2019 | Okawa .................... B66B 3/008 |

FOREIGN PATENT DOCUMENTS

| EP | 0385255 A1 | 9/1990 |
| EP | 3138800 A1 | 3/2017 |
| EP | 3388381 A1 | 10/2018 |
| JP | 2003246564 A | 9/2003 |
| KR | 101497784 B1 * | 3/2015 |
| WO | 2015162263 A1 | 10/2015 |

OTHER PUBLICATIONS

Machine Translation of KR 10-1497784.*

* cited by examiner

*Primary Examiner* — Diem M Tran
(74) *Attorney, Agent, or Firm* — Slater Matsil, LLP

(57) ABSTRACT

The present disclosure refers to an elevator system particularly for high buildings, comprising: an elevator car comprising one or more electrical service appliances; a counterweight; a power source housed into the counterweight; a hoisting cable connected at a first end to the elevator car and at a second end to the counterweight and comprising carbon nanotube (CNT) yarns, wherein the CNT yarns mechanically support the elevator car and the counterweight and are electric conductor from the power source to the electrical service appliances.

20 Claims, 3 Drawing Sheets

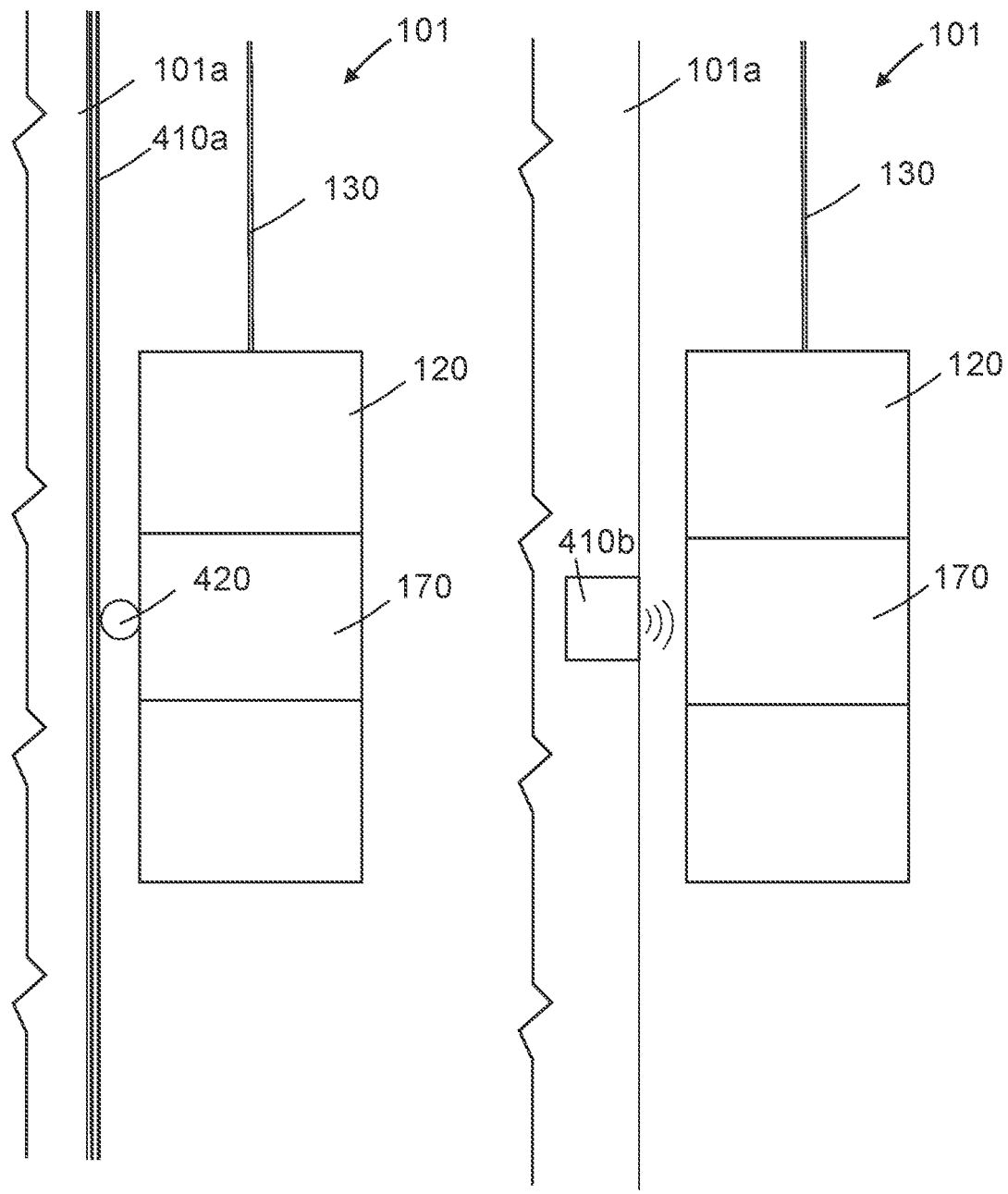

ELEVATOR SYSTEM

CROSS-REFERENCE TO RELATED APPLICATIONS

This application claims the benefit of Italian Patent Application No. 102018000009826 filed on Oct. 26, 2018, which application is hereby incorporated herein by reference.

TECHNICAL FIELD

The present invention relates generally to elevators, and, in particular embodiments, to an elevator system for high buildings.

BACKGROUND

As it is known, an elevator system generally comprises an elevator car connected to a counterweight through a hoisting cable. The hoisting cable passes on a sheave or on a sheave system usually placed at the top of the elevator shaft and that is provided with a motor that, by actuating the sheave or the sheave system, moves upward or downward the elevator car through the hoisting cable. The hoisting cable is usually made by one or more steel ropes or belts.

Generally, the elevator system also comprises a trailing cable for transmitting electric power and data signals to the elevator car. In particular, a trailing cable can transmit the electric power for the service appliances of the elevator car, such as the lighting devices, the displays, the interphone, the air-conditioning system, the ventilation system and so on. As "service appliances" of the elevator car are meant all the appliances not involved in the movement of the elevator car.

The trailing cable is usually fixed at one end to the elevator car and at the other one end to an electrical distribution box placed on one side of the elevator shaft, for example at an intermediate position with respect to the elevator stroke.

The trailing cable is usually made of electric power or communication conductors enveloped by an insulating layer.

In view of the increasing demand for higher and higher buildings, new challenges have been arisen for manufacturing elevator systems, in particular relating to hoisting cables for elevator car support and trailing cables.

In a high building with a very long elevator shaft the moving mass contribution given by the hoisting cable and by the trailing cable becomes relevant and represents a significant limitation for the elevator system design.

A hoisting steel cable for high building should need to be very long and then results to be very heavy.

As for the trailing cable, it is subjected to strong stresses due to potentially violent slam caused by the airflow due to the fast movement of the elevator car.

Therefore, the trailing cable should be robust and as much as possible securely fixed to the elevator car and to the electrical distribution box. This implies the making of trailing cables increasingly heavier.

For the above reasons hoisting cables comprising carbon nanotubes (CNTs) as strength components have been proposed for substituting steel and making the cable lighter. CNTs in the hoisting cable have been hinted also for transporting electrical signals.

WO20015162263 relates to a hoisting member for an elevator system including a core having strength components embedded in a matrix material. The strength components may be made from carbon nanotube material with the matrix material made from a polymer material. The CNT are configured to carry the load of elevator cars. In some embodiments, the CNT are configured to transmit electrical signals through hoisting member to provide power to elevator car and/or provide communication between controller and elevator car. Accordingly, an additional trailing cable that provides power to elevator car is not required.

US20110061976 relates to a battery counterweighted elevator, wherein a counterweight is provided substantially by electrical storage batteries used to power the elevator. A substantial portion of the weight of the counterweight comprises one or more electric storage batteries. A traveling power cable extends between the elevator car and the counterweight. The traveling power cable provides electrical power from the storage batteries within the counterweight to the elevator drive motor installed in or on the car. An additional traveling cable comprises a control and communications cable that may extend between the elevator car and the counterweight.

U.S. Pat. No. 4,402,386 relates to a self-powered elevator having an inverter controlled asynchronous linear electric motor as counterweight. The motor may preferably be fed with current from a main feeder, connected to a floating battery across a charger, the battery itself being connected to the motor across an inverter. All the components, of known type, may form a constituent part of the counterweight. The battery may be recharged by means of a suspended cable, or preferably by means of socket connectors located at the main landing level. The elevator car slides on two guide rails, suspended by rope.

SUMMARY

In accordance with a first embodiment, the present disclosure relates to an elevator system comprising: an elevator car comprising one or more electrical service appliances; a counterweight; a power source housed into the counterweight; a hoisting cable connected at a first end to the elevator car and at a second end to the counterweight and comprising carbon nanotube (CNT) yarns, wherein the CNT yarns mechanically support the elevator car and the counterweight and are electric conductor from the power source to the electrical service appliances.

In the hoisting cable of the disclosure, the first end is opposed to the second end.

In an embodiment the carbon nanotube (CNT) in the yarns of the present disclosure are of the multi-wall type.

In an embodiment the CNT in the yarns of the present disclosure are of the few-wall type.

In an embodiment, the power source into the counterweight comprises a rechargeable electrical battery. In this way, the power source does not need frequent maintenance, thus the maintenance costs are reduced.

In an embodiment, the elevator system can comprise a recharger system comprising a fixed power supply source associable to/in an elevator shaft wall, and operatively contacting the power source in the counterweight.

According to this embodiment, the battery recharging process does not need the interruption of the elevator system operation.

In an embodiment the fixed power supply source electrically contacts the power source.

In an alternative embodiment, the fixed power supply source contacts the power source by electromagnetic induction.

In an embodiment the elevator car and/or the counterweight are provided with a first wireless data transceiver. This feature allows to monitor in real-time the elevator system operation, to collect and retrieve monitoring data, and to communicate with the elevator car.

According to this embodiment, the elevator system can comprise a plurality of second wireless data transceivers fixable to an elevator shaft side. The second wireless data transceivers are connected to each other and to a controller configured to control them for transmitting or receiving data signals to and from the elevator car or the counterweight.

In an embodiment, the hoisting cable is adapted to transmit also data signals between the counterweight and the elevator car.

In an embodiment, the elevator system comprises an auxiliary cable comprising carbon nanotube yarns, the auxiliary cable being mechanically and electrically connected at third end to the elevator car and at the forth end to the counterweight.

In the auxiliary cable of the disclosure, the third end is opposed to the fourth end.

According to this embodiment, there is a redundancy of the overall power supply to the elevator car and/or to split the transmission of the overall power supply energy among two lines.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, the terms "a" and "an" are employed to describe elements and components of the disclosure. This is done merely for convenience and to give a general sense of the disclosure. This description should be read to include one or at least one, and the singular also includes the plural unless it is obvious that it is meant otherwise.

BRIEF DESCRIPTION OF THE DRAWINGS

Further characteristics will be apparent from the detailed description given hereinafter with reference to the accompanying drawings, in which:

FIGS. 4a and 4b are schematic views of exemplary recharger systems for the elevator system according to the present disclosure.

DETAILED DESCRIPTION OF ILLUSTRATIVE EMBODIMENTS

Embodiments of the present application reduce the weight of the cables that hoist and power the elevator car and simplify the design of an elevator system, in particular for very high building.

The Applicant found that a hoisting cable comprising CNTs sized for mechanical purpose is suitable to bring enough electric power for the electrical service appliances of the elevator car.

To provide electrical power for feeding the hoisting cable and, accordingly, the service appliances of the elevator car, Applicant realized to exploit a counterweight containing a power source and to mechanically and electrically connect such counterweight to the elevator car by means of a CNT hoisting cable.

In this way, the use of a trailing cable and all the disadvantages related to the trailing cable are avoided. Also the use of a CNT hoisting cable reduces the contribution given by the hoisting cable weight in the elevator system design.

The power source inside the counterweight should be suitable to power just the service appliances of the elevator car, thus it should be capable of providing an electric power of about few kWs.

Figure 1:
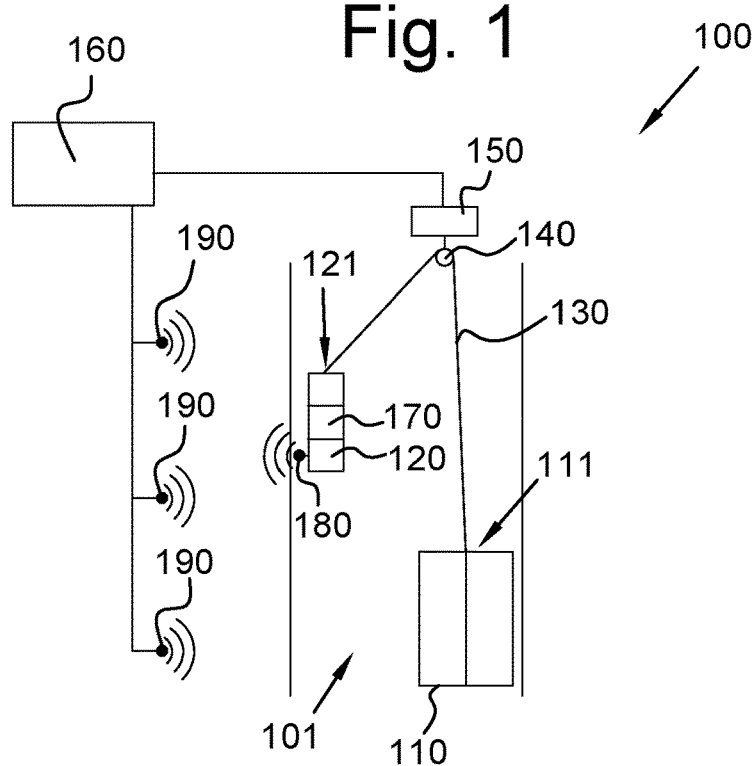
FIG. 1 is a schematic view of an elevator system according to a first embodiment of the present disclosure.
Figure 2:
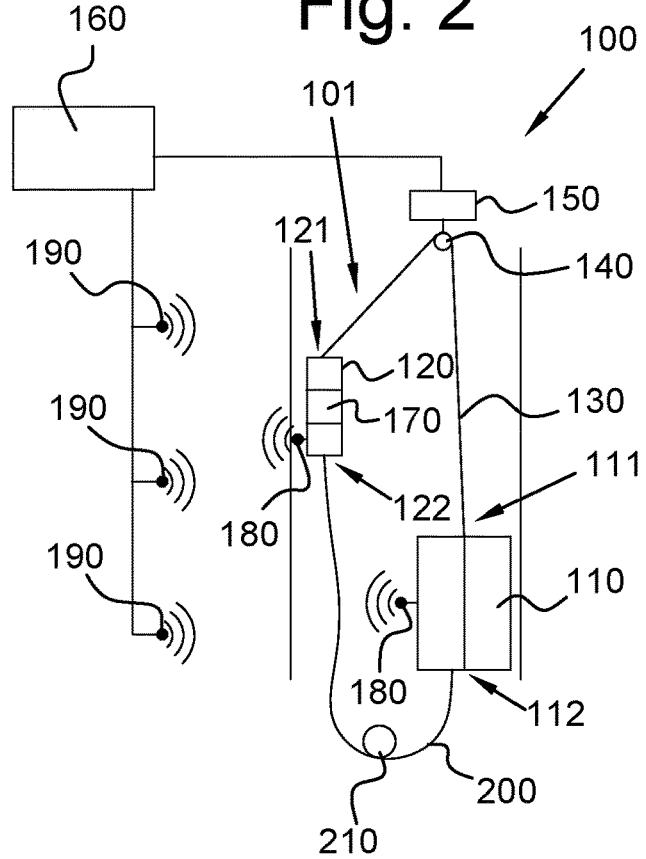
FIG. 2 is a schematic view of an elevator system according to a second embodiment of the present disclosure.

An elevator system 100 according to the present disclosure is shown in FIG. 1 or 2.

The elevator system 100 is suitable for being installed inside an elevator shaft 101 and comprises an elevator car 110, a counterweight 120 and a hoisting cable 130 connecting the elevator car 110 to the counterweight 120. In particular, the hoisting cable 130 passes on a sheave or sheave system 140 usually placed at the top of the elevator shaft lot. The sheave or sheave system 140 is operatively connected to a motor 150 actuating the sheave or sheave system 140 to make moving upward or downward the elevator car 110 by the hoisting cable 130.

The motor 150 is operatively connected to a controller 160 configured to actuate the motor 150 according to a command signal generated by a user, for example by pushing the call button for the elevator car 110.

The elevator car 110 comprises one or more electrical service appliances, like, for example, one or more lighting devices, one or more displays, the interphone, the air-conditioning system, the ventilation system and so on.

A power source 170 is housed into the counterweight 120. In particular, the power source 170 is suitable for supplying electric power for the one or more electrical service appliances of the elevator car 110. For example, the power source 170 is suitable for supplying an electric power amounting to 1 kW, or 3 kW, or 8 kW.

The hoisting cable 130 is mechanically and electrically connected at a first end 111 to the elevator car 110 and at a second end 121 to the counterweight 120 so as to provide electrical power from the power source 170 inside the counterweight 120 to the one or more electrical service appliances of the elevator car 110, and, at the same time, to support the elevator car 110 and the counterweight 120 both moving and in stationary configurations, as the mechanical and electrical connectors (not illustrated) for the hoisting cable 130 are positioned at the top of the elevator car 110 and of the counterweight 120.

In the embodiment of FIG. 2, the elevator system 100 further comprises an auxiliary cable 200 comprising carbon nanotube yarns. This auxiliary cable 200 is mechanically and electrically connected at a third end 112 to the elevator car 110 and at the forth end 122 to the counterweight 120.

According to this embodiment, there is a redundancy of the overall power supply to the elevator car and/or it is possible to split the transmission of the overall power supply energy among two lines.

In an embodiment of the present disclosure, the power source 170 inside the counterweight 120 comprises a rechargeable electrical battery.

As from FIG. 4a or 4b, the elevator system of the present disclosure can comprise a recharger system comprising a fixed power supply 410a, 410b associable to/in the elevator shaft wall 101a and operatively contacting the power source 170 (e.g. a battery) in the counterweight 120. For example the contacts can be of the magnetic induction type, or of the direct contact electric type.

In the embodiment of FIG. 4a, the fixed power supply 410a is a power cable vertically running along elevator shaft wall 101a in correspondence with the run of counterweight 120 which is provided with a wheel or shoe 420 establishing an electrical contact between the cable 410a and the battery 170 during the movement of the elevator car 110.

In the embodiment of FIG. 4b, the fixed power supply 410b is an AC power supply-charger associated to or in the elevator shaft wall 101a in correspondence with the position of the battery 170 of counterweight 120 at one or more stops of the elevator car 110. When the elevator car 110 stops, the AC power supply-charger 410b establishes an inductive contact with the battery 170 and recharges it by electromagnetic induction.

In an embodiment, the elevator car 110 and/or the counterweight 120 are provided with respective first wireless data transceiver 180.

In this case a plurality of second wireless data transceivers 190 are fixed to the elevator shaft side connected to each other and to a controller—which can be the same controller 160 configured to actuate the motor 150—configured to control them for transmitting or receiving data signals to and from the elevator car 110 or the counterweight 120.

The second wireless data transceivers 190 can be positioned along the side of the elevator shaft.

In an embodiment, the hoisting cable 130 is adapted to transmit data signals between the counterweight 120 and the elevator 110. The first wireless data transceivers 180 can be associated just with the counterweight 120; the data can be transmitted from the controller 160 to the counterweight 120 through the wireless connection and then from the counter weight 120 to the elevator car 110 through the cabled connection represented by the hoisting cable 130.

In the embodiment of FIG. 2, the elevator system 100 comprises an auxiliary cable 200 comprising carbon nanotube yarns connecting mechanically and electrically the elevator car 110 to the counterweight 120.

The auxiliary cable 200 can be used as a redundant cable for the overall power supply to the elevator car 110 and/or for splitting such overall power supply between the hoisting cable 130 and the auxiliary cable 200.

The mechanical and electrical connectors for the auxiliary cable 200 can be positioned at the bottom of the elevator car 110 and of the counterweight 120.

According to this embodiment, the elevator system 100 can comprise an auxiliary sheave or sheave system 210 positioned at the bottom of the elevator shaft and over which the auxiliary cable 200 passes.

Figure 3A:
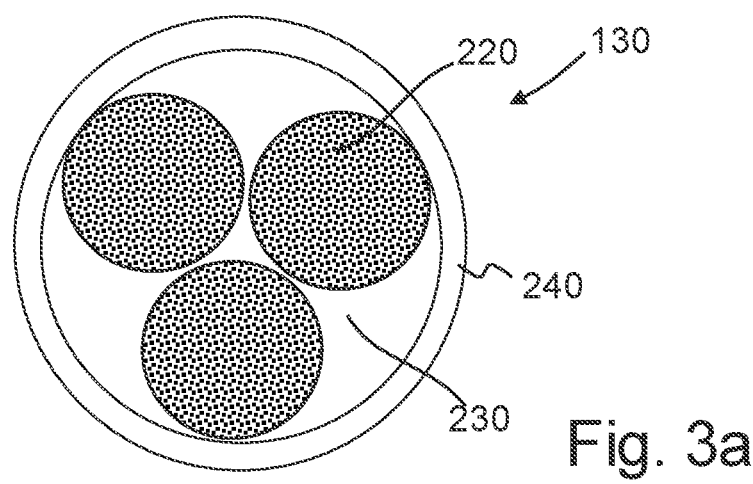
FIGS. 3a and 3b are schematic cross-sectional views of hoisting cables comprised in the elevator system according to the present disclosure.
Figure 3B:
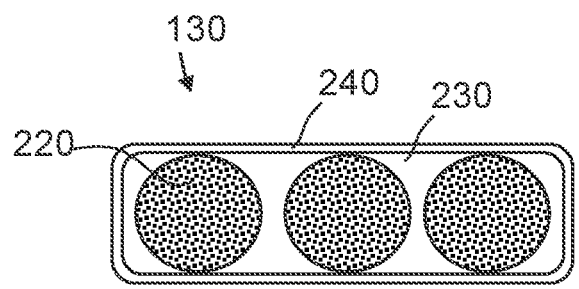

The hoisting cable 130 can have a round or a flat cross-section as from FIGS. 3a and 3b, respectively.

As from FIG. 3a or 3b, the hoisting cable 130 comprises carbon nanotube (CNT) yarns in form of three CNT yarn bundles 220 adapted for acting as strength member and electric conductor (conductor, return conductor and ground conductor, respectively). The hoisting cable 130 can be made of CNT braided yarns 220 contained, in tight configuration, in an electrically insulating layer 230 made, for example, of polyurethane or rubber (EPR, PCP, PSC, CPE) based material. A sheath 240 can be provided around the electrically insulating layer 230.

In an embodiment, the electrically insulating layer 230 and the sheath 240 are made of the same material and can be the same layer.

In a not illustrated embodiment, no electrically insulating layer 230 is provided and the CNT yarn bundles 220 are electrically insulated by a respective insulating layer.

The CNT yarns have a specific strength (strength-to-weight ratio) greater than that of a high carbon steel, a density of roughly 1 g/cm$^3$ and are electrically conductive.

The CNT of the yarns can be of the multi-wall type, in particular of the few-wall type.

A CNT of the multi-wall type comprises a plurality of layers, for example a plurality of concentric graphene layers. In the particular case of the few-wall type, a CNT comprises about from 3 to 5 layers.

In an embodiment, each CNT of the yarn of the present hoisting cable has a diameter comprised between 2 to 20 nm (single CNT diameter) and a length comprised between few microns to few hundreds of microns up to 10 mm.

An example of elevator system according to the present disclosure is sized as follows. An elevator car suitable to transport up to 10 persons, and the relevant counterweight amount to 2500 kg of moving mass. Such moving mass can be supported by a hoisting cable similar to the one of FIG. 3a or 3b where the three bundles of CNT yarns (in the present example, CNT is a product marketed as Miralon™ by Nanocomp) have a total cross section of 168 mm$^2$. If a steel hoisting cable is used, total cross section of the three steel rope would amount to 150 mm$^2$.

The hoisting cable of the present example having a total CNT cross-section of 168 mm$^2$ is suitable for carrying 6 kW to the elevator car from a 400 V battery (like LG Chem RESU 400V) positioned in the counterweight.

What is claimed is:

1. An elevator system comprising:
   an elevator car comprising one or more electrical service appliances;
   a counterweight;
   a power source housed in the counterweight; and
   a hoisting cable connected at a first end to the elevator car and at a second end to the counterweight, the hoisting cable comprising carbon nanotube (CNT) braided yarns, wherein the CNT braided yarns mechanically support the elevator car and the counterweight and are electric conductor from the power source to the electrical service appliances, wherein the CNT braided yarns are contained, in tight configuration, in an electrically insulating layer, and wherein the CNT braided yarns are three, each being, respectively, a first conductor to provide a forward current path, a second conductor to provide a return current path, and a third conductor to provide a ground current path.

2. The elevator system according to claim 1, wherein the carbon nanotube in the yarns are of the multi-wall type.

3. The elevator system according to claim 1, wherein the carbon nanotube in the yarns are of the few-wall type.

4. The elevator system according to claim 1, wherein the power source in the counterweight comprises a rechargeable electrical battery.

5. The elevator system according to claim 1, further comprising a recharger system comprising a fixed power supply source associable to/in an elevator shaft wall, and operatively contacting the power source in the counterweight.

6. The elevator system according to claim 5, wherein the fixed power supply source electrically contacts the power source.

7. The elevator system according to claim 5, wherein the fixed power supply source contacts the power source by electromagnetic induction.

8. The elevator system according claim 1, wherein the elevator car or the counterweight is provided with a first wireless data transceiver.

9. The elevator system according to claim 8, further comprising a plurality of second wireless data transceivers fixable to an elevator shaft side connected to each other and to a controller that is configured to control them for transmitting or receiving data signals to and from the elevator car or the counterweight.

10. The elevator system according to claim 8, wherein the hoisting cable carries data signals between the counterweight and the elevator car.

11. The elevator system according to claim 1, further comprising an auxiliary cable comprising carbon nanotube yarns mechanically and electrically connected at a third end to the elevator car and at a forth end to the counterweight.

12. An elevator system comprising:
a power source housed in a counterweight; and
a hoisting cable comprising a first end and a second end, the first end of the hoisting cable being connected to an elevator car and the second end of the hoisting cable being connected to the counterweight, the hoisting cable comprising carbon nanotube (CNT) braided yarns, wherein the CNT braided yarns mechanically support the elevator car and the counterweight and electrically couple the power source to electrical service appliances in the elevator car; and
a recharger system comprising a fixed power supply source associable to/in an elevator shaft wall, and operatively contacting the power source in the counterweight, wherein the hoisting cable is made of the CNT braided yarns contained, in tight configuration, in an electrically insulating layer, and wherein the CNT braided yarns are three, each being, respectively, a first conductor to provide a forward current path, a second conductor to provide a return current path, and a third conductor to provide a ground current path.

13. The elevator system according to claim 12, wherein the fixed power supply source electrically contacts the power source.

14. The elevator system according to claim 12, wherein the fixed power supply source contacts the power source by electromagnetic induction.

15. The elevator system according to claim 12, further comprising an auxiliary cable comprising carbon nanotube yarns mechanically and electrically connected at a third end to the elevator car and at a forth end to the counterweight.

16. An elevator system comprising:
an elevator car comprising one or more electrical service appliances;
a counterweight;
a power source housed in the counterweight;
a hoisting cable connected at a first end to the elevator car and at a second end to the counterweight, the hoisting cable comprising carbon nanotube (CNT) braided yarns, wherein the CNT braided yarns of the hoisting cable are configured to mechanically support the elevator car and the counterweight and are electric conductor from the power source to the electrical service appliances; and
an auxiliary cable connected at one end to the elevator car and at an opposite end to the counterweight, the auxiliary cable comprising CNT braided yarns, wherein the CNT braided yarns of the auxiliary cable are configured to mechanically support the elevator car and the counterweight and provide an electric conductor from the power source to the electrical service appliances.

17. The elevator system according to claim 16, wherein the elevator car and the counterweight is provided with a first wireless data transceiver, and wherein the first wireless data transceiver of the elevator car and the first wireless data transceiver of the counterweight are configured to communicate with a controller.

18. The elevator system according to claim 16, wherein the CNT braided yarns are contained, in tight configuration, in an electrically insulating layer, and wherein the CNT braided yarns are three, each being, respectively, a first conductor to provide a forward current path, a second conductor to provide a return current path, and a third conductor to provide a ground current path.

19. The elevator system according to claim 16, wherein the power source in the counterweight comprises a rechargeable electrical battery.

20. The elevator system according to claim 16, further comprising a recharger system comprising a fixed power supply source associable to/in an elevator shaft wall, and operatively contacting the power source in the counterweight.

* * * * *